United States Patent [19]

Stansbury

[11] 4,442,478
[45] Apr. 10, 1984

[54] AUTOMATICALLY ACTUATED ENCLOSURE LIGHT

[76] Inventor: Benjamin H. Stansbury, 409 N. Foothill Rd., Beverly Hills, Calif. 90210

[21] Appl. No.: 350,419

[22] Filed: Feb. 19, 1982

[51] Int. Cl.³ .............................................. F21L 7/00
[52] U.S. Cl. .................................. 362/191; 362/80; 362/127; 362/133; 362/190; 362/155; 362/200; 362/201; 362/205; 362/253; 362/368; 200/60
[58] Field of Search .............. 362/394, 802, 295, 200, 362/208, 94, 155, 133, 127, 80, 191, 205, 204, 203, 196, 190, 253, 368, 201; 200/61.61, 61.7, 61.73, 61.78, 61.71, 61.74, 61.62, 60

[56] References Cited

U.S. PATENT DOCUMENTS

| | | | |
|---|---|---|---|
| 1,098,628 | 6/1914 | Hyman | 362/196 X |
| 1,673,436 | 6/1928 | Barany | 362/205 |
| 1,906,131 | 4/1933 | Baylis | 362/200 |
| 2,006,175 | 6/1935 | Osborn | 362/205 |
| 2,164,239 | 6/1939 | Grayson | 362/394 X |
| 2,249,692 | 7/1941 | Gelardin | 362/200 |
| 2,373,553 | 4/1945 | Fetterman | 362/205 |
| 3,057,992 | 10/1962 | Baker | 362/200 |
| 3,711,703 | 1/1973 | Bacevius | 362/196 X |
| 4,160,887 | 7/1979 | Van Buren | 362/155 X |
| 4,168,411 | 9/1979 | Peck | 362/155 X |

Primary Examiner—Donald G. Kelly
Assistant Examiner—John S. Maples
Attorney, Agent, or Firm—Romney, Golant, Martin, Disner & Ashen

[57] ABSTRACT

Enclosures such as drawers and glove compartments are provided with a light that automatically turns on when the enclosure is opened and turns off when closed. This light has a lightbulb in circuit with batteries and a switching mechanism, including a spring and actuator for the spring which is mounted to rotate, move linearly outwardly and inwardly relative to the light's housing, or do both simultaneously. The actuator has a portion engaging the spring and an arcuate edge portion extending beyond the housing which engages a surface of the enclosure when the enclosure is opened or closed. During relative movement between the enclosure surface and the light, the actuator moves the spring between two positions, one of which opens the circuit to the lightbulb, the other of which closes this circuit.

2 Claims, 15 Drawing Figures

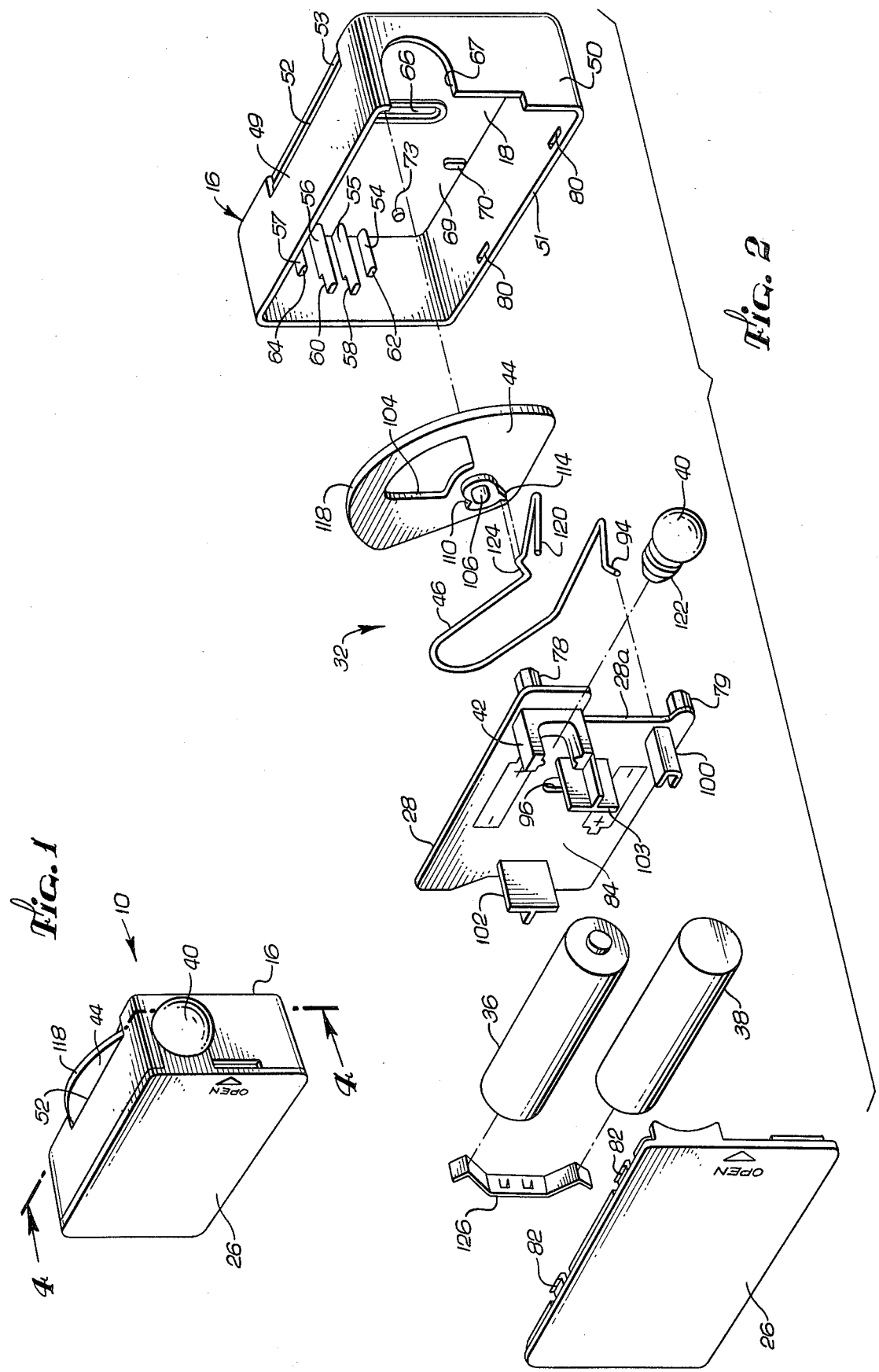

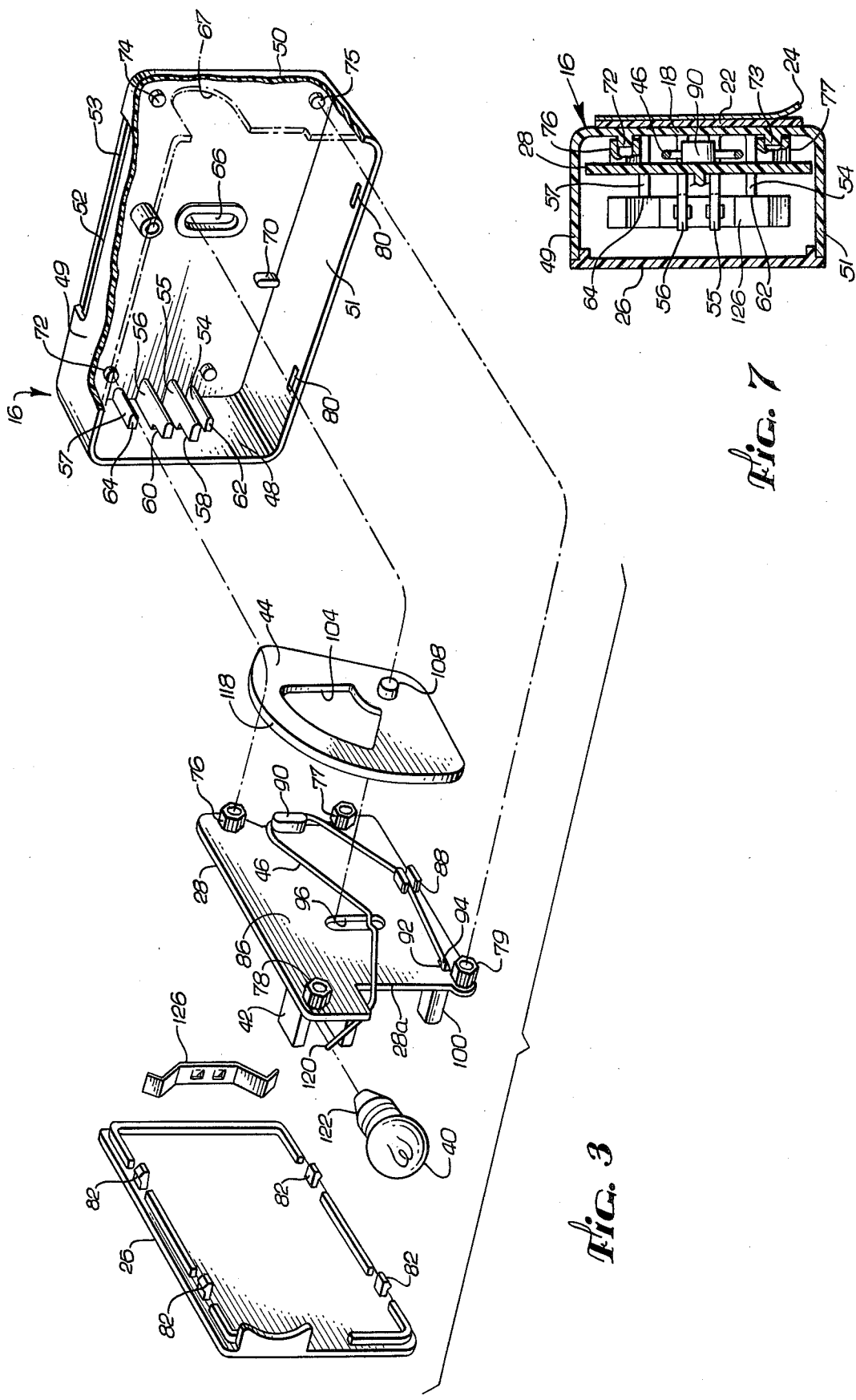

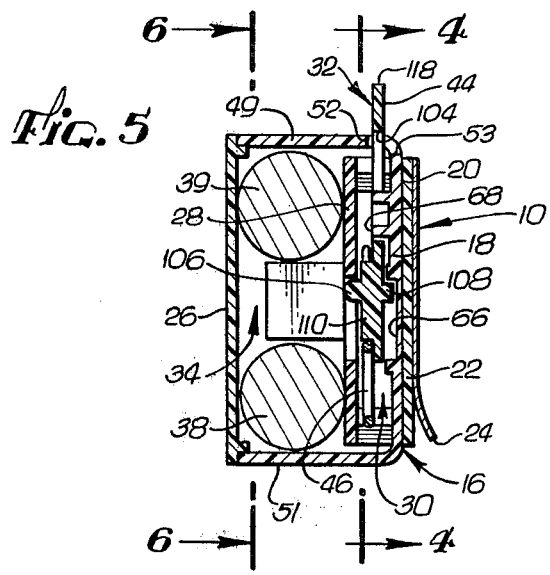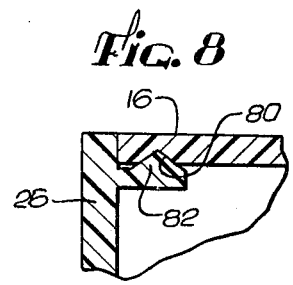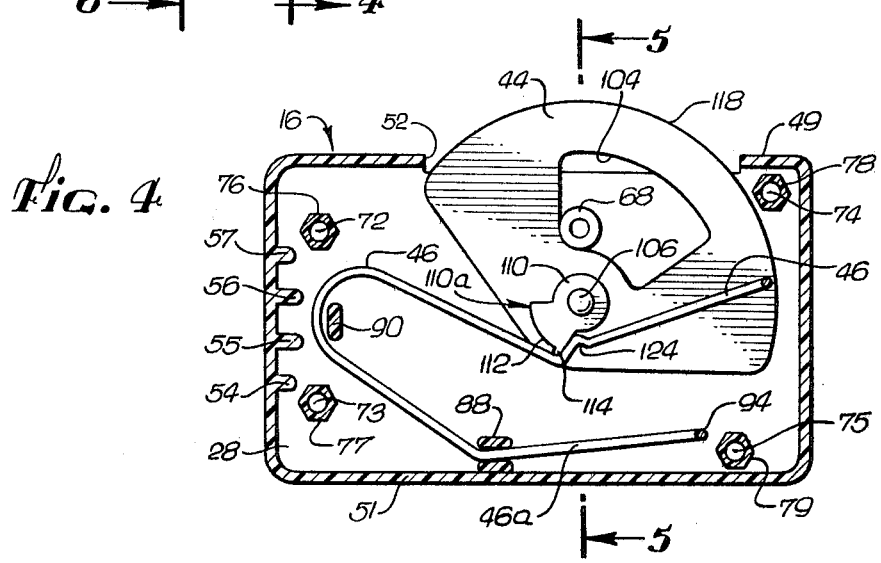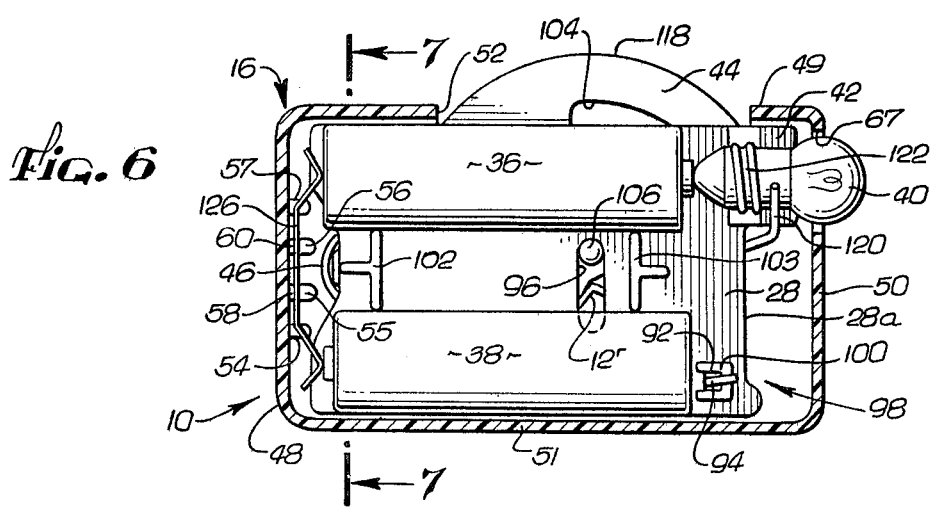

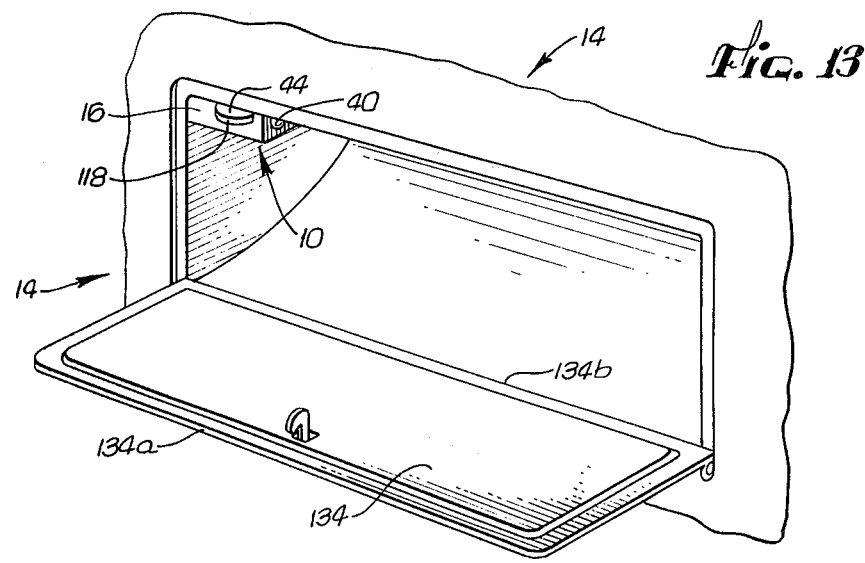
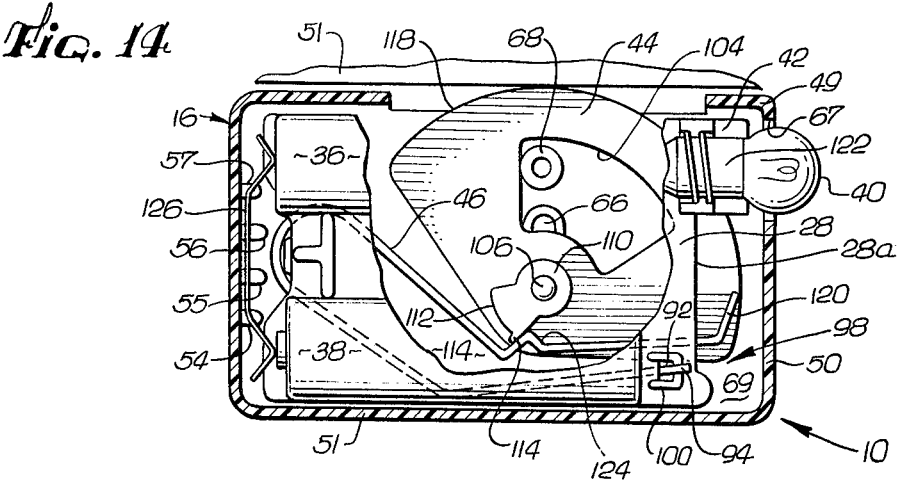
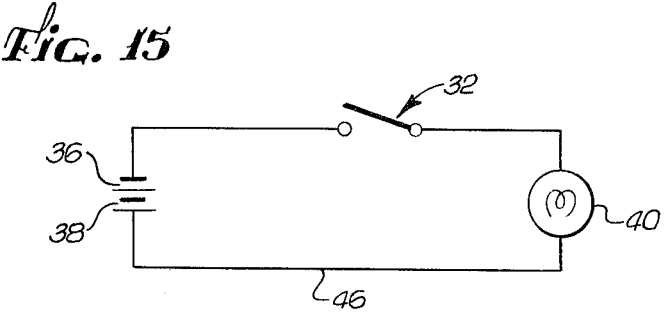

AUTOMATICALLY ACTUATED ENCLOSURE LIGHT

BACKGROUND OF THE INVENTION

1. Field of the Invention

The present invention relates to a battery-operated light and, more particularly, to a portable, battery-operated light which operates automatically in drawers, glove compartments or similar enclosures when such enclosures are opened and closed.

2. Description of the Prior Art

Enclosures are generally of two types. One is the type like a drawer where the enclosure is formed by a cavity defined by the furniture structure into which the drawer is received at the mouth of the cavity. This type of enclosure is opened by pulling the drawer from the cavity to expose the inside of the drawer. When the drawer is closed, the drawer front provides a cover for the mouth of the cavity and, during opening and closing of this drawer enclosure, there is relative movement between the drawer and furniture structure such that the drawer moves along a path which is generally parallel to a reference plane, for example, the plane in which the top surface of the cavity lies. The other enclosure type is like a glove compartment where the enclosure is formed by a cavity in a wall or the like and a door is mounted at the mouth of the cavity by means of a hinge. To open this second type of enclosure, a latch holding the door over the mouth of the cavity is released and the door is rotated about its hinge, exposing the interior of the cavity. With this second type of enclosure during opening and closing of the enclosure, the hinged edge of the door remains more or less in a fixed position while the unhinged door edge directly opposite of this hinged edge moves along an arc of a circle. When the unhinged door edge approaches the closed position it is moving along a line that is generally at a right angle with respect to the cavity mouth or, more precisely, the plane in which the cavity mouth lies.

Generally, lights for enclosures are designed to turn on or off automatically upon opening or closing the enclosure, and include a switch actuator that usually engages the enclosure cover and moves inwardly with respect to the body of the enclosure when the cover is closed and outwardly with respect to the body of the enclosure when the cover is opened. The switch actuator ordinarily is a pin having a rounded tip which provides a cam surface that engages, for example, the glove compartment cover during closing so that the cover engages the cam surface and depresses the pin. In glove compartment type enclosures, the pin location normally is not critical since all that is required is to depress the pin sufficiently to break the light circuit.

SUMMARY OF THE INVENTION

The present invention is a battery-powered light for an enclosure which automatically turns on when the enclosure is opened and turns off when the enclosure is closed. This light is adapted to be used in two different modes, one of which the light is mounted in a drawer type enclosure, the other of which the light is mounted in a glove compartment type enclosure. The principal components of the light are a housing having a battery compartment for holding batteries and a switch compartment for holding switching means, means for holding a lightbulb, and switching means for turning the lightbulb on and off. The switching means is disposed in the switch compartment and it includes a movable conductor which, in a first position, provides a closed circuit between the batteries in the battery compartment and the lightbulb, and in a second position opens this circuit. In accordance with one of the principal features of this invention, an actuator for the switching means is mounted to rotate, to move linearly inwardly and outwardly relative to the housing, or to do both simultaneously.

This invention has several advantages. It is portable, light-weight, compact, and easy to manufacture and assemble. It is an inexpensive, automatically operating light source for just about any dark enclosure. It can be used to light existing enclosures, or could be built into new enclosures. Its principal advantages, however, are (1) that it may be used in two different modes of operation, one mode wherein the actuator will rotate, or rotate and move linearly, during operation, and another mode wherein the actuator will essentially only move linearly, and (2) that it is easily installed in either a glove compartment or drawer type enclosure without the need to place the light in any precise location. These principal advantages are realized as long as there is engagement between the actuator for the switching means and a surface of the enclosure upon relative movement between the light and such surface. These and other advantages will be apparent upon reading the DESCRIPTION OF THE PREFERRED EMBODIMENT which follows.

THE DRAWINGS

FIG. 1 is a perspective view of the light of this invention.

FIG. 2 is an exploded perspective view of the light of this invention as viewed from the left.

FIG. 3 is another exploded perspective view of the light of this invention, as viewed from the right, with sections broken away and the batteries not shown.

FIG. 4 is a cross-sectional view taken along line 4—4 of FIG. 5.

FIG. 5 is a right-sided cross-sectional view taken along line 5—5 of FIG. 4.

FIG. 6 is a cross-sectional view taken along line 6—6 of FIG. 5.

FIG. 7 is a left-sided cross-sectional view taken along line 7—7 of FIG. 6.

FIG. 8 is an enlarged partial elevational view of one of the housing cover's male members received within an indentation in a side wall of the housing.

FIG. 9 is a perspective view of the light of this invention mounted in a drawer enclosure.

FIG. 10 is a cross-sectional view taken along line 10—10 of FIG. 9 showing the light just about to engage the drawers cross-bar that serves as a stop for the drawer when it is fully closed.

FIG. 11 is a cross-sectional view showing the light off when the drawer shown in FIG. 10 is closed.

FIG. 12 is the same cross-sectional view of the light as shown in FIG. 6 except that sections are broken away to show the spring and actuator position when the drawer is closed as shown in FIG. 11.

FIG. 13 is a perspective view of the light of this invention mounted in a glove compartment type of enclosure, with the glove compartment door being open.

FIG. 14 is the same cross-sectional view of the light as shown in FIG. 6 except that sections are broken away to show the spring and actuator position when the glove compartment door shown in FIG. 13 is closed.

FIG. 15 is a simplified wiring diagram showing the electrical circuit for the light of this invention.

DESCRIPTION OF THE PREFERRED EMBODIMENT

While the present invention is susceptible to modifications and alternative constructions, an illustrative embodiment is shown in the drawings and will be described in detail hereinbelow. It should be understood, however, that it is not the intention to limit the invention to the particular form disclosed; but on the contrary, the invention is to cover all modifications, equivalences, and alternative constructions falling within the spirit and scope of the invention as expressed in the appended claims.

Figures 9, 10, 11, 12:
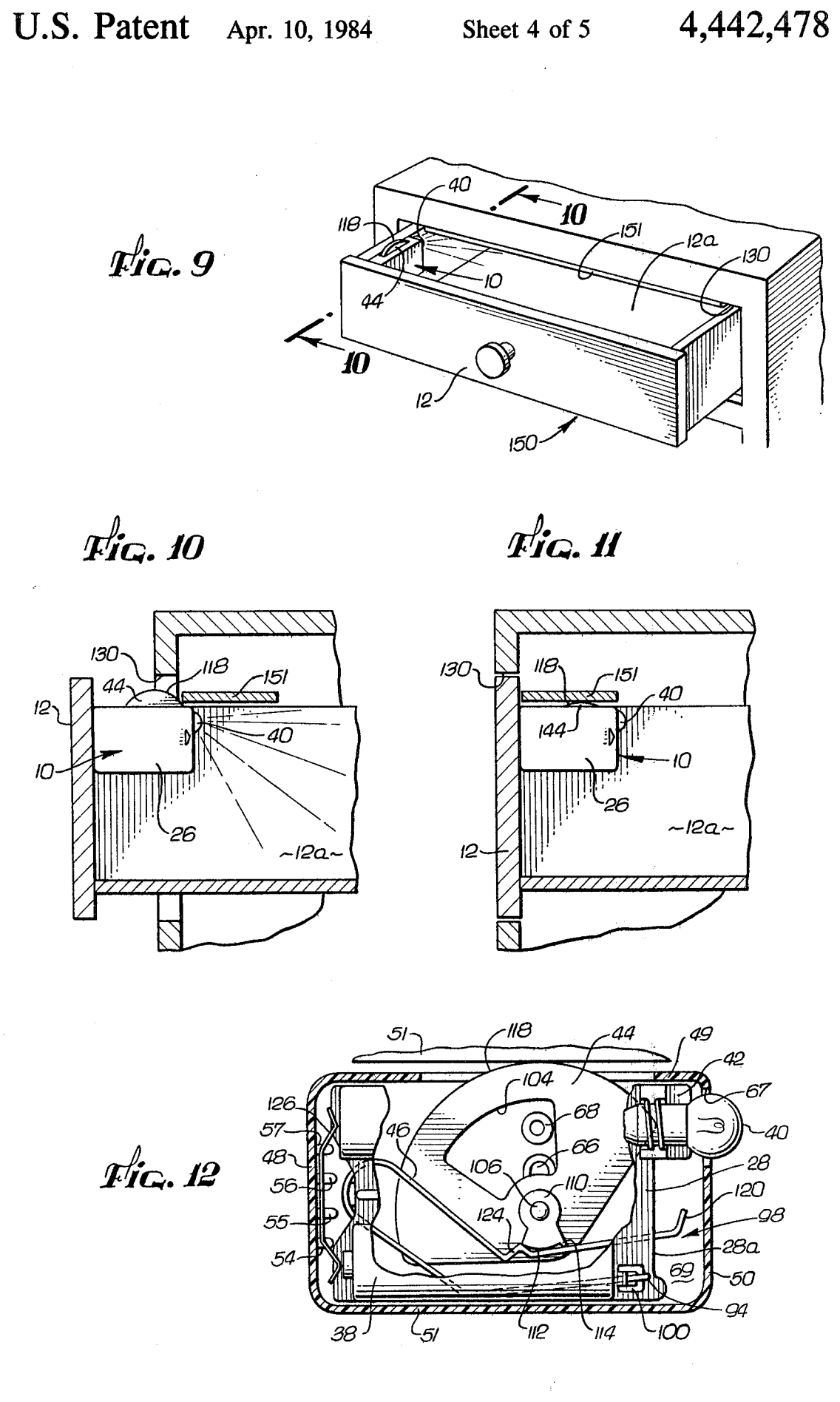

As shown in FIG. 1, the enclosure light 10 of this invention is a portable, light-weight, compact device which may be removably attached to the inside of a drawer 12 as depicted in FIG. 9 or to the inside of a glove compartment 14 as depicted in FIG. 13. This light 10 includes a housing 16 having a base wall 18, the exterior surface 20 (FIG. 5) of which carries a suitable adhesive 22 for securing the light 10 to an enclosure wall. A mask 24 covers this adhesive 22 until the light 10 is to be placed in the enclosure.

As best illustrated in FIGS. 2 and 3, the principal components of the light 10 are (a) the housing 16 (b) a housing cover 26, (c), a divider wall 28 which separates the interior of the housing into two compartments, a switch compartment 30 (FIG. 5) which carries a switching mechanism 32 for the light and a battery compartment 34 which holds the batteries 36 and 38 that power the light, (d) a lightbulb 40 which is received in a socket or lightbulb holder 42 that is integral with the divider wall, and (e) the switching mechanism 32 received within the switch compartment, which includes an actuator 44 and a metal spring 46. The housing 16, divider wall 28, actuator 44, and housing cover 26 are molded from plastic using conventional techniques. These plastic components electrically isolate the circuit shown in FIG. 15.

The housing 16, as best shown in FIG. 3, is a generally box-like structure including the base wall 18 and four side walls 48 through 51 which are integral with the base wall and generally at right angles to the base wall. These four side walls 48 through 51 are joined together at their edges. The side wall 49 has an elongated opening 52 therein which receives a portion of the switch acuator 44 of the switching mechanism 32. There is also an elongated opening 54 in the base wall 18 which is co-extensive with, and contiguous to, the elongated opening 52 in the side wall 49. Integral with the side wall 48 are pillars 54 through 57, with the two central pillars 55 and 56 being slightly longer than the two outer pillars 54 and 57. These central pillars 55 and 56 include grooves 58 and 60, the bottoms of which are along a line which intersects the tops or ledges 62 and 64 provided by the pillars 54 and 57. The side wall 50 has a socket opening 67 through which the lightbulb 40 passes. The interior surface 69 of the base wall 18 includes a recess 66 and directly above this recess is a outwardly projecting stop member 68. A rib 70 in this base wall 18 serves as support for the divider wall 28 and four pins 72 through 75 projecting outwardly from the base wall are aligned with hexagonal sockets 76 through 79 in the divider wall. There are indentations 80 in the side walls 49 and 51 which receive male members 82 in the cover 26 when the cover is placed on the housing 16.

The divider wall 28 has a face 84 (FIG. 2) and a back 86 (FIG. 3), and the hexagonal sockets 76 through 79 are near the corners on the back. Also on the back 86 are slotted guide 88 and guide 90, and a hole 92 near hexagonal socket 79 adapted to receive one end 94 of the spring 46 for the switch mechanism 32. The face 84 of the divider wall 28 includes a spacer 100 having a "U"-shaped cross-section which partially encircles the hole 92, two "T"-shaped spacers 102 and 103, and the bulb holder 42. An elongated slot 96 passes through the divider wall 28 and, when this wall is placed in position in the housing 16, this slot will be in registration with the elongated recess 66 in the base wall 18 of the housing. There is a cut away section 28a of the divider wall 28 which provides, when the components of the light are assembled, a passageway 98 (FIG. 6) that permits communication between the switch and battery compartments 30 and 34. The spring 46 passes through this passageway 98.

The switching mechanism, as best shown in FIG. 4, includes the actuator 44 and the spring 46 which normally is biased to urge the actuator outwardly from the housing 16. The actuator 44 has the general appearance of a quarter section of a wheel and has within it an enlarged opening 104 and, below this opening, two outwardly projecting elements 106 and 108 which together serve as an axle for the actuator. Integral with the one element 106 is a cam piece 110 having cam edge 110a (FIGS. 4, 12, and 14), including a smooth curved section 112 which terminates in a lip 114. The top portion of the actuator also has a cam edge 118 inscribing an arc and adapted to engage a surface of the enclosure. The actuator is disposed within the switch compartment 30 so that the stop member 68 projects into but not through the enlarged opening 104, with the axle element 108 received within the recess 66 and axle element 106 received within the elongated slot 96. Thus the recess 66 and opening 96, respectively, provide guideways for the axle elements 108 and 106.

As best shown in FIGS. 4 and 6, the spring 46 is twisted so that it winds about the guides 88 and 90 with its end 120 (FIG. 6) in contact with the threaded metallic end 122 of the light bulb 40 and its end 94 in contact with the negative terminal of the battery 38. The battery contact end 94 of the spring 46 projects through the hole 92 and is received within the "U"-shaped guide 100. A straight portion 46a of the spring then proceeds to pass between the slotted guides 88 and bends at this point upwardly towards the guide 90. Here it loops around the guide 90 and reverses direction proceeding along a straight line toward the elongated slot 96. The portion of the spring adjacent the elongated slot 96 is formed into a knuckle 124 which will engage the cam edge 112 and lip 114. From this knuckle 124 the spring 46 proceeds to the passageway 98 where it bends upward towards the lightbulb 40 and then terminates at the bulb contact end 120.

The light 10 is easy to assemble. First the spring 46 is mounted on the divider wall 28 by simply manually forcing it into the slotted guide 88, with its one end 94 being pushed into the hole 92. The actuator 44 is next placed in the housing 16 so that its arcuate edge 118 projects through the opening 52. Then the divider wall 28 is placed in the housing 16 so that its back 86 faces the interior surface 69 of the base wall 18 and the hexagonal sockets 76, 77, 78, and 79 are aligned with and in mating engagement with the pins 72, 73, 74, and 75. The spring 46 normally urges the actuator outwardly, with the knuckle 124 engaging the cam lip 114 as shown in FIG. 4. As best shown in FIG. 6, a contact spring 126 is then placed within the grooves 58 and 60 of the pillars 55 and 56 and the batteries 36 and 38 are placed in the battery compartment 34 on opposite sides of T-shaped spaces 102 and 103, with the one end 94 of the spring 46 in contact with the negative terminal of the one battery 38. This battery 38 has its positive terminal in contact with the contact spring 126 which in turn contacts the negative terminal of battery 36 which has its positive terminal contacting the metallic threaded end 122 of the lightbulb 40. The contact spring 126, pressing firmly against the batteries 36, 38, ensures good electrical contact between the end 94 of spring, the batteries, and the metallic threaded end 122 of the lightbulb 40. As shown in FIG. 8, the cover 26 is then placed over the housing 16 and pressed against the housing to force the cover's male members 82 into the indentations 80 in the housing walls 49 and 51. Finally, the lightbulb 40 is screwed into the bulbholder 42.

OPERATION

As stated above, the principal advantages of the light 10 are that it is particularly adapted to be used in two different modes of operation and is easy to install regardless of the type of enclosure, without the need to place the light in any precise location. As will be appreciated from the following discussion, these advantages are realized primarily because the actuator 44 may rotate, move linearly inwardly and outwardly relative to the housing 16, or do both simultaneously.

In one mode of operation as shown in FIGS. 9 through 12, the actuator will rotate, or rotate and move linearly, during operation. In this mode, the light 10 is mounted in a drawer enclosure 150 so that the arcuate edge 118 of the actuator will come into contact with a cross bar 151 that acts as a stop for the drawer 12. Mounting is accomplished by simply removing the mask 24 covering the adhesive and firmly pressing the exterior surface 20 of the housing against the inside 12a of the drawer 12. In this example, the light is mounted so that the actuator 44 engages the cross-bar 151 adjacent the opening 130 in which the drawer is received when the drawer is closed. When the drawer is opened as shown in FIG. 10, moving the light generally along a path which is parallel to the plane in which the cross bar 151 lies, the spring 46 urges the actuator 44 outwardly with the bulb contact end 120 of the spring 46 engaging the metallic threaded end 122 of the lightbulb 40. This completes the circuit 132 shown in FIG. 15, turning on the light 10. As the drawer 12 is closed, the arcuate edge 118 of the actuator engages the cross bar 151, causing the actuator to rotate in a counter-clockwise direction as shown in FIGS. 4 and 12. This turns the cam piece 110 so that the lip 114 engages the knuckle 124 on the spring 46, depressing the spring and breaking the circuit 132 to the lightbulb 40. When the drawer 12 is opened, the spring 46, being biased to move the actuator outwardly, engages the cam piece 110 causing the actuator to rotate in a clockwise direction, to return the actuator and spring to the position shown in FIG. 6.

In accordance with one feature of this invention the actuator may rotate, move linearly inwardly or outwardly relative to the housing 16, or do both simultaneously. When the cross bar 151 of the enclosure opening 150 engages the arcuate edge 118 of the actuator 44, the frictional force between the edge 118 and the cross bar causes the actuator to rotate about the axle elements 106 and 108. If the edge 118 and the cross bar 151 just touch, there will be essentially no linear movement of the actuator, only rotational movement. In most instances, however, the clearance between the cross bar and the arcuate edge will result in an inwardly directed force being exerted on the actuator when the edge and surface engage. Consequently, the actuator will move inwardly in a linear direction while simultaneously rotating. The edges of the enlarged opening 104 in the actuator upon engaging the stop member 68 serve to limit the extent to which the actuator may be rotated or moved in or out linearly. As the actuator rotates and moves inwardly, the axle elements 106 and 108 are guided, respectively, in slot 96 and recess 66, and the spring 46 is depressed, moving it to the position shown in FIG. 12. As shown in FIG. 12 the actuator has been rotated and moved inwardly relative to the housing 16 so that, in the fully depressed condition shown in FIG. 12, the cam piece 110 has been moved to a position where the curved section 112 engages the knuckle 124.

Because the actuator is mounted as illustrated, the light 10 may be installed in the drawer enclosure 150 without the need to position precisely the light with respect to the cross-bar 151. Typically the arcuate edge 118 of the actuator will, when the light is on, extend from about $\frac{1}{4}$ to about $\frac{1}{2}$ inches beyond the housing 16. If, for example, the actuator extends $\frac{1}{4}$ inch beyond the housing 16, as long as the light is attached to the inner wall 153 of the enclosure 151 at a point which is within $\frac{1}{4}$ inch from the cross bar 151, there will be engagement of this cross bar and the actuator. Since only the arcuate edge 118 contacts the cross bar during closing of the enclosure 150, there is avoided any chance of damage to the light. The light 10 may also be placed closer than $\frac{1}{4}$ inch to the top inside surface 128 without adversely affecting the operation of the light. Thus precision location of the light with respect to the cross bar is not required, because there is an enlarged cam surface provided by arcuated edge 118 that insures correct engagement of this edge and the cross bar over a relatively wide range of light positions.

As shown in FIGS. 13 and 14, in the other mode of operation the actuator 44 does not rotate, but only moves linearly, with the axle elements 106 and 108 riding in the slot 96 and recess 66, respectively. In this mode of operation the unhinged edge 134a opposite the hinged edge 134b, as the door 134 approaches the closed position, is moving along a path that is generally at a right angle to the mouth of the enclosure cavity. When the door engages the actuator depressing it, the lip 114 of the cam piece 110 simply urges the spring 46 away from the lightbulb 40 until it reaches the position shown in FIG. 14, opening the circuit shown in FIG. 15 to turn off the light. In this mode the cam piece 110 does not move relative to the knuckle 124, remaining in engagement therewith as the actuator moves into the housing. When the enclosure door 134 is opened, the spring 46, being normally biased outwardly, returns to its normal position moving the actuator outwardly from the housing until the actuator and spring return to the positions shown in FIG. 6, closing the circuit to turn on the light. Here again installation is easy and precision location of the light 10 with respect to the door 134 is not required. All that is required is that engagement between the door and actuator occur on closure of the door. Since the edge 134a proceeds, during closure, along a line which is generally at a right angle with respect to the plane in which the cavity mouth lies, upon the door engaging the actuator essentially only linear movement of the actuator occurs. This is also the case upon opening the door.

What is claimed is:

1. A battery-powered light for an enclosure which turns on when the enclosure is opened and turns off when the enclosure is closed, said light comprising
    (a) a housing mountable to said enclosure having a base with interior and exterior surfaces, and wall means which are integral with the base and joined together to form the housing, said interior surface having a recess therein and a stop member extending outwardly therefrom, and said wall means having a first opening therein through which projects an arcuate edge portion of the actuator means defined below in paragraph (cii) when the light is turned on and a second opening therein for receiving a lightbulb,
    (b) a divider wall in the housing to form therein a first compartment adapted to receive switching means and a second compartment adapted to receive battery means, said compartments being in communication with each other through a passageway and said divider wall having therein an elongated slot and thereon socket means for holding a lightbulb, and being located within the housing so that the elongated slot is aligned with the recess in the interior surface of the base and the socket means is aligned with said second opening, and
    (c) switching means disposed in the first compartment which includes
        (i) conductive spring means moveable between a bulb engagement position and a bulb disengagement position, said spring means having one end secured to the divider wall and adapted to contact battery means in the second compartment and an intermediate segment passing through the passageway between the compartments, said intermediate segment terminating in a bulb contact end adapted to contact a lightbulb in the socket means when the spring means is in the bulb engagement position and disengages from contact with the lightbulb when the spring means is in the bulb disengagement position,
        (ii) actuator means for the spring means including a body member having cam means for engaging the spring means, an enlarged opening in the body member, axle means outwardly projecting from the body member, and an arcuate edge along a portion of the body member, said actuator means being disposed in the first compartment so that the axle means is received within the elongated slot in the divider wall and the recess in the base, with the stop member passing through the enlarged opening in body member and the arcuate edge portion of the body member passing through the first opening in the wall means whereby, upon opening and closing of the enclosure, the arcuate edge portion engages a surface of the enclosure during relative movement between such enclosure surface and the arcuate edge portion, and depending upon the type of enclosure and the manner of mounting said housing to said enclosure, causing in one mode the body member to rotate about the axle means, and in another mode to move linearly inwardly and outwardly relative to the housing with the axle means moving within and being guided by said elongated slot and recess, and in a third mode to rotate and to move linearly simultaneously, with the cam means moving the spring means between the bulb engagement position and the bulb disengagement position.

2. The light of claim 1 wherein the housing includes means for attaching the light to the enclosure.

* * * * *